(12) United States Patent
Sun et al.

(10) Patent No.: US 10,484,696 B2
(45) Date of Patent: Nov. 19, 2019

(54) METHOD AND APPARATUS FOR COLOR INDEX PREDICTION

(71) Applicant: MEDIATEK INC., Hsinchu (TW)

(72) Inventors: Yu-Chen Sun, Keelung (TW); Tzu-Der Chuang, Zhubei (TW); Yi-Wen Chen, Taichung (TW); Yu-Wen Huang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 121 days.

(21) Appl. No.: 15/038,599

(22) PCT Filed: Jan. 7, 2015

(86) PCT No.: PCT/CN2015/070278
§ 371 (c)(1),
(2) Date: May 23, 2016

(87) PCT Pub. No.: WO2015/103980
PCT Pub. Date: Jul. 16, 2015

(65) Prior Publication Data
US 2016/0301938 A1    Oct. 13, 2016

Related U.S. Application Data

(60) Provisional application No. 62/059,239, filed on Oct. 3, 2014, provisional application No. 62/033,199, filed (Continued)

(51) Int. Cl.
*H04N 19/186* (2014.01)
*H04N 19/70* (2014.01)
(Continued)

(52) U.S. Cl.
CPC ......... *H04N 19/186* (2014.11); *H04N 19/176* (2014.11); *H04N 19/182* (2014.11); (Continued)

(58) Field of Classification Search
CPC .. H04N 19/186; H04N 19/593; H04N 19/176; H04N 19/463
(Continued)

(56) References Cited

U.S. PATENT DOCUMENTS 7,343,037 B1    3/2008  Kadatch
7,903,873 B2    3/2011  Lu et al.
(Continued)

FOREIGN PATENT DOCUMENTS

CN    101068352 A    11/2007
CN    101217668 A    7/2008
(Continued)

OTHER PUBLICATIONS

Guo, L., et al.; "Palette Mode for Screen Content Coding;" Joint Collaborative Team on Video Coding (JCT-VC) of ITU-T SG 16 WP 3 and ISO/IEC JTC 1/SC 29/WG 11; Apr. 2013; pp. 1-11.
(Continued)

*Primary Examiner* — On S Mung
(74) *Attorney, Agent, or Firm* — Oblon, McClelland, Maier & Neustadt, L.L.P.

(57) ABSTRACT

A method and apparatus for coding a block of video data using index or pixel value prediction including a copy-by-pattern-search mode are disclosed. According to the present invention, a current search pattern is determined based on one or more previous coded pixels. One or more predictors are derived according to the current search pattern for a current index or pixel value of a current pixel in the current block. Encoding or decoding is then applied to one or more following indices or pixel values of one or more following pixels including the current pixel using the predictors. In a simplest case, the one or more previous coded pixels cor-
(Continued)

US 10,484,696 B2
Page 2 respond to a single previous coded pixel at the left side of the current pixel and the one or more following pixels contain only the current pixel.

21 Claims, 4 Drawing Sheets

Related U.S. Application Data on Aug. 5, 2014, provisional application No. 62/027,334, filed on Jul. 22, 2014, provisional application No. 62/021,289, filed on Jul. 7, 2014, provisional application No. 62/002,221, filed on May 23, 2014, provisional application No. 61/972,584, filed on Mar. 31, 2014, provisional application No. 61/969,872, filed on Mar. 25, 2014, provisional application No. 61/952,917, filed on Mar. 14, 2014, provisional application No. 61/932,832, filed on Jan. 29, 2014, provisional application No. 61/924,333, filed on Jan. 7, 2014.

(51) Int. Cl.
| | |
|---|---|
| H04N 19/463 | (2014.01) |
| H04N 19/93 | (2014.01) |
| H04N 19/176 | (2014.01) |
| H04N 19/182 | (2014.01) |
| H04N 19/129 | (2014.01) |

(52) U.S. Cl.
CPC ........... *H04N 19/463* (2014.11); *H04N 19/70* (2014.11); *H04N 19/93* (2014.11); *H04N 19/129* (2014.11)

(58) Field of Classification Search
USPC .................................................. 375/240.12
See application file for complete search history.

(56) References Cited

U.S. PATENT DOCUMENTS

| | | | |
|---|---|---|---|
| 9,654,806 | B2 | 5/2017 | Zou et al. |
| 9,749,628 | B2 | 8/2017 | Chuang et al. |
| 2009/0074307 | A1 | 3/2009 | Lu et al. |
| 2009/0110305 | A1 | 4/2009 | Fenney |
| 2009/0147855 | A1 | 6/2009 | Song et al. |
| 2011/0135000 | A1 | 6/2011 | Alshina et al. |
| 2013/0003837 | A1 | 1/2013 | Yu et al. |
| 2013/0170546 | A1 | 7/2013 | Kim et al. |
| 2013/0251046 | A1 | 9/2013 | Matsunobu et al. |
| 2013/0272401 | A1 | 10/2013 | Seregin et al. |
| 2013/0301734 | A1 | 11/2013 | Gisquet et al. |
| 2014/0003531 | A1 | 1/2014 | Coban et al. |
| 2014/0036033 | A1 | 2/2014 | Takahashi et al. |
| 2014/0050267 | A1 | 2/2014 | Sakurai et al. |
| 2014/0086333 | A1 | 3/2014 | Wang |
| 2014/0105002 | A1 | 4/2014 | Pan |
| 2014/0241630 | A1 | 8/2014 | MacInnis et al. |
| 2014/0286427 | A1 | 9/2014 | Fukushima et al. |
| 2014/0301475 | A1 | 10/2014 | Guo et al. |
| 2015/0016501 | A1 | 1/2015 | Guo et al. |
| 2015/0146976 | A1* | 5/2015 | Ma .......................... H04N 1/646 382/166 |

FOREIGN PATENT DOCUMENTS

| | | |
|---|---|---|
| CN | 101340587 A | 1/2009 |
| CN | 101645173 A | 2/2010 |
| CN | 101816177 A | 8/2010 |
| CN | 103248893 A | 8/2013 |
| CN | 103392341 A | 11/2013 |
| CN | 106464873 A | 2/2017 |
| EP | 2 645 719 A2 | 10/2013 |
| WO | WO 2009/036255 | 3/2009 |
| WO | WO 2012/147622 | 11/2012 |
| WO | WO 2012/160890 | 11/2012 |
| WO | 2012/171463 A1 | 12/2012 |
| WO | WO 2013/046095 | 4/2013 |
| WO | 2013/069216 A1 | 5/2013 |
| WO | 2015/179814 A1 | 11/2015 |

OTHER PUBLICATIONS

Chen, J., et al.; "Description of screen content coding technology proposal by Qualcomm;" Joint Collaborative Team on Video Coding (JCT-VC) of ITU-T SG 16 WP 3 and ISO/IEC JTC 1/SC 29/WG 11; Apr. 2014; pp. 1-19.

International Search Report dated Mar. 27, 2015, issued in application No. PCT/CN2015/070278.

Yu, Y., et al.; "Adaptive Scan for Large Blocks for HEVC;" Joint Collaborative Team on Video Coding (JCT-VC) of ITU-T SG16 WP3 and ISO/IEC JTC1/SC29/WG11; Jul. 2011; pp. 1-6.

Sun, Y.C., et al.; "AHG10: A triplet palette mode combining JCTVC-P0108 and JCTVC-P0198;" Joint Collaborative Team on Video Coding (JCT-VC) of ITU-T SG16 WP3 and ISO/IEC JTC1/SC29/WG11; Mar.-Apr. 2014; pp. 1-9.

Zhu J. et al.; "AHG10: Adaptive Scan Order on Palette Based Coding;" Joint Collaborative Team on Video Coding (JCT-VC) of ITU-T SG16 WP3 and ISO/IEC JTC1/SC29/WG11; Mar.-Apr. 2014; pp. 1-4.

Esenlik, S., et al.; "AHG4: Dependent slices restriction;" Joint Collaborative Team on Video Coding (JCT-VC) of ITU-T SG16 WP3 and ISO/IEC JTC1/SC29/WG11; Oct. 2012; pp. 1-6.

Misra, K., et al.; "Modifications to palette coding for tiles/slices/dependent slices/ wavefronts;" Joint Collaborative Team on Video Coding (JCT-VC) of ITU-T SG16 WP3 and ISO/IEC JTC1/SC29/WG11; Jun.-Jul. 2014; pp. 1-4.

Zhu W. et al.; "Non-RCE3 Template-based palette prediction;" Joint Collaborative Team on Video Coding (JCT-VC) of ITU-T SG16 WP3 and ISO/IEC JTC1/SC29/WG11; Apr. 2013; pp. 1-8.

Chuang, T.D., et al.; "Non-RCE4: Four-neighbor major color index prediction;" Joint Collaborative Team on Video Coding (JCT-VC) of ITU-T SG16 WP3 and ISO/IEC JTC1/SC29/WG11; Jan. 2014; pp. 1-5.

Laroche, G., et al.; "Non-RCE4: Palette Prediction for Palette mode;" Joint Collaborative Team on Video Coding (JCT-VC) of ITU-T SG16 WP3 and ISO/IEC JTC1/SC29/WG11; Jan. 2014; pp. 1-6.

Sun, Y.C., et al.; "Non-RCE4: Removal of syntax redundancy in RCE4 Test2;" Joint Collaborative Team on Video coding (JCT-VC) of ITU-T SG16 WP3 and ISO/IEC JTC1/SC29/WG11; Jan. 2014; pp. 1-5.

Seregin, V., et al.; "Non-SCCE3: Palette predictor resetting;" Joint Collaborative Team on Video Coding (JCT-VC) of ITU-T SG16 WP3 and ISO/IEC JTC1/SC29/WG11; Jun.-Jul. 2014; pp. 1-4.

Joshi, R., et al.; "RCE2: Summary report on HEVC Range Extensions Core Experiment 2 (RCE2) on prediction and coding techniques for transform-skip and transform-bypass blocks;" Joint Collaborative Team on Video Coding (JCT-VC) of ITU-T SG16 WP3 and ISO/IEC JTC1/SC29/WG11; Jul.-Aug. 2013; pp. 1-12.

Suo, L., et al.; "RCE3: Results of Test 3.1 on Palette Mode for Screen Content Coding;" Joint Collaborative Team on Video Coding (JCT-VC) of ITU-T SG16 WP3 and ISO/IEC JTC1/SC29/WG11; Jul.-Aug. 2013; pp. 1-7.

Sun, Y.C., et al.; "SCCE3 Test B.4: Adaptive color index map scan;" Joint Collaborative Team on Video Coding (JCT-VC) of ITU-T SG16 WP3 and ISO/IEC JTC1/SC29/WG11; Jun.-Jul. 2014; pp. 1-16.

\* cited by examiner

METHOD AND APPARATUS FOR COLOR INDEX PREDICTION

CROSS REFERENCE TO RELATED APPLICATIONS

The present invention claims priority to U.S. Provisional Patent Application, Ser. No. 61/924,333, filed on Jan. 7, 2014, U.S. Provisional Patent Application, Ser. No. 61/932, 832, filed on Jan. 29, 2014, U.S. Provisional Patent Application, Ser. No. 61/952,917, filed on Mar. 14, 2014, U.S. Provisional Patent Application, Ser. No. 61/969,872, filed on Mar. 25, 2014, U.S. Provisional Patent Application, Ser. No. 61/972,584, filed on Mar. 31, 2014, U.S. Provisional Patent Application, Ser. No. 62/002,221, filed on May 23, 2014, U.S. Provisional Patent Application, Ser. No. 62/021,289, filed on Jul. 7, 2014, U.S. Provisional Patent Application, Ser. No. 62/027,334, filed on Jul. 22, 2014, U.S. Provisional Patent Application, Ser. No. 62/033,199, filed on Aug. 5, 2014 and U.S. Provisional Patent Application, Ser. No. 62/059,239, filed on Oct. 3, 2014. The U.S. Provisional patent applications are hereby incorporated by reference in their entireties.

TECHNICAL FIELD

The present invention relates to color index coding for video data. In particular, the present invention relates to techniques to improve the performance of color index coding by using color index prediction based on pattern search.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include range extensions (RExt) which target at non-4:2:0 color formats, such as 4:2:2 and 4:4:4, and higher bit-depths video such as 12, 14 and 16 bits per sample. One of the likely applications utilizing RExt is screen sharing, over wired- or wireless-connection. Due to specific characteristics of screen contents, coding tools have been developed and demonstrate significant gains in coding efficiency. Among them, the color index coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the color index coding becomes very effective for screen content materials.

During the early development of HEVC range extensions (RExt), several proposals have been disclosed to address palette-based coding. For example, a palette prediction and sharing technique is disclosed in JCTVC-N0247 (Guo et al., "*RCE3: Results of Test 3.1 on Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-N0247) and JCTVC-O0218 (Guo et al., "*Evaluation of Palette Mode Coding on HM-12.0+RExt-4.1*", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0218). In JCTVC-N0247 and JCTVC-O0218, the palette of each color component is constructed and transmitted. The palette can be predicted (or shared) from its left neighboring CU to reduce the bitrate. All pixels within the given block are then coded using their palette indices. An example of encoding process according to JCTVC-N0247 is shown as follows.

1. Transmission of the palette: the color index table size is first transmitted followed by the palette elements.
2. Transmission of pixel values: the pixels in the CU are encoded in a raster scan order. For each group of one or more pixels, a flag for a run-based mode is first transmitted to indicate whether the "run" mode or "copy-above" mode is being used.
   2.1 "run" mode: In the "run" mode, a palette index is first signaled followed by "palette_run" (e.g., M) representing the run value. The run value indicates that a total of M samples are all coded using "run" mode. No further information needs to be transmitted for the current position and the following M positions since they have the same palette index as that signaled in the bitstream. The palette index (e.g., i) may also be shared by all three color components, which means that the reconstructed pixel values are (Y, U, V)=(palette$_Y$[i], palette$_U$[i], palette$_V$[i]) for the case of YUV color space.
   2.2 "copy-above" mode: In the "copy-above" mode, a value "copy_run" (e.g., N) is transmitted to indicate that for the following N positions (including the current one), the palette index is the same as the corresponding palette index in the row above.
3. Transmission of residue: the palette indices transmitted in Stage 2 are converted back to pixel values and used as the prediction. Residue information is transmitted using HEVC residual coding and is added to the prediction for the reconstruction.

In JCTVC-N0247, the palette of each component are constructed and transmitted. The palette can be predicted (shared) from its left neighboring CU to reduce the bitrate. In JCTVC-O0218, each element in the palette is a triplet, representing a specific combination of the three color components. The predictive coding of palette across CU is removed.

Yet another major color-base coding (color index coding) method is disclosed by Guo et al. in JCTVC-O0182 (Guo et al., "*AHG8. Major-color-based screen content coding*", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0182). According to JCTVC-O0182, the palette of each component are constructed and transmitted. However, instead of predicting the entire palette from the left CU, individual entry in a palette can be predicted from the exact corresponding palette entry in the above CU or left CU.

According to JCTVC-O0182, a predictive coding method is applied on the indices for transmission of pixel values, where a pixel line can be predicted by different modes. In specific, three kinds of line modes are used for a pixel line, i.e. horizontal mode, vertical mode and normal mode. In horizontal mode, all the pixels in the same line have the same value. If the value is the same as the first pixel of the above pixel line, only line mode signaling bits are transmitted. Otherwise, the index value is also transmitted. In vertical mode, the current pixel line is the same with the above pixel line. Therefore, only line mode signaling bits are transmitted. In normal mode, pixels in a line are predicted individually. For each pixel, the left or above neighboring pixel is used as predictor, and the prediction symbol is transmitted to the decoder. Furthermore, pixels are classified into major color pixels and escape pixels. For major color pixels, the decoder reconstructs the pixel values using the major color indices and palette. For escape pixels, the encoder will further send the pixel values.

It is desirable to develop methods for further improving the coding efficiency associated with the color index coding.

SUMMARY

A method and apparatus for color index coding of a block of video data using index or pixel value prediction including a copy-by-pattern-search mode are disclosed. According to the present invention, a current search pattern is determined based on one or more previous coded pixels. One or more predictors are derived according to the current search pattern for a current index or pixel value of a current pixel in the current block. Encoding or decoding is then applied to one or more following indices or pixel values of one or more following pixels including the current pixel using the predictors. In a simplest case, the one or more previous coded pixels correspond to a single previous coded pixel at the left side of the current pixel and the one or more following pixels contain only the current pixel. The search pattern may be based on one or more previous coded indices. The one or more previous coded indices may correspond to individual color indices or joint color indices. A run length can be used to indicate the number of the following pixels coded using the predictors.

The predictors can be derived according to the current search pattern utilizes a pattern relation table (PRT), wherein each search pattern points to an entry of the pattern relation table and each entry of the pattern relation table contains one or more candidate predictors. The pattern relation table may store index values or pixel values used as the predictors. The pattern relation table may also store motion vector values used to locate target reference pixels to retrieve respective indices or pixel values as the predictors.

The pattern relation table can be updated according to the current search pattern and the following indices. When the one or more previous coded pixels correspond to a single previous coded pixel and the one or more following pixels consist of the current pixel only, the pattern relation table can be updated according to an index or pixel value pair corresponding to a decoded index or pixel value on a left side of the current pixel and a current candidate index or pixel value for the current index. If said one or more following indices or pixel values correspond to one search pattern of the previous decoded indices or pixel values, the pattern relation table is not updated. If the following indices or pixel values correspond to one existing prediction pattern of another prediction mode, the pattern relation table is not updated. If the following indices or pixel values correspond to one existing candidate predictor of the pattern relation table, the pattern relation table is not updated. A selected entry of the pattern relation table is removed if an associated search pattern of the selected entry corresponds to a longest latest-used-time search pattern or a least used search pattern.

If the pattern relation table contains more than one candidate predictors for each search pattern, a selection indication can be used to indicate a selected candidate predictor. If the pattern relation table contains an escape index, the escape index can be replaced by a replacement index. The replacement index may correspond to a predefined index or is derived from one or more neighboring decoded indices.

The pattern relation table can be reused by multiple blocks corresponding to coding units (CUs), prediction units (PUs) or transform units (TUs) within a coding tree unit (CTU), a tile or a slice. The pattern relation table can be modified before the pattern relation table is reused by a next block within the coding tree unit (CTU) or the slice. The pattern relation table can be modified by identifying color correspondences between the current block and the next block and modifying the pattern relation table according to identified color correspondences.

A scanning pattern traverses through all pixels of the current block in multiple directions, and multiple pattern relation tables associated with said multiple directions may be used for said encoding or decoding of said one or more following pixels. The scanning pattern may correspond to horizontal snake scan, vertical snake scan, zigzag scan, or Hilbert scan. The multiple pattern relation tables may comprise a first table associated with left-to-right direct and a second table associated with right-to-left direction.

If a derived palette predictor for the current index is larger than a maximum valid index or pixel value, the derived predictor can be replaced by a predefined index or pixel, or a derived index or pixel. The derived predictor can be replaced by the derived index or pixel corresponding to a smallest index value or pixel that is not a valid index or pixel of said one or more predictors. The derived predictor can be set to zero.

The coding may further comprise a copy-above mode and a copy-left mode. The coding modes can be signaled using binary codes and the binary codes can be coded using context based coding.

BRIEF DESCRIPTION OF DRAWINGS

FIGS. 1A-1B illustrate an example of converting color values of neighboring pixels to color indices according to the color index table of Table 3, where the neighboring pixel values in FIG. 1A are converted to neighboring pixel indices in FIG. 1B.

DETAILED DESCRIPTION

Figure 2:
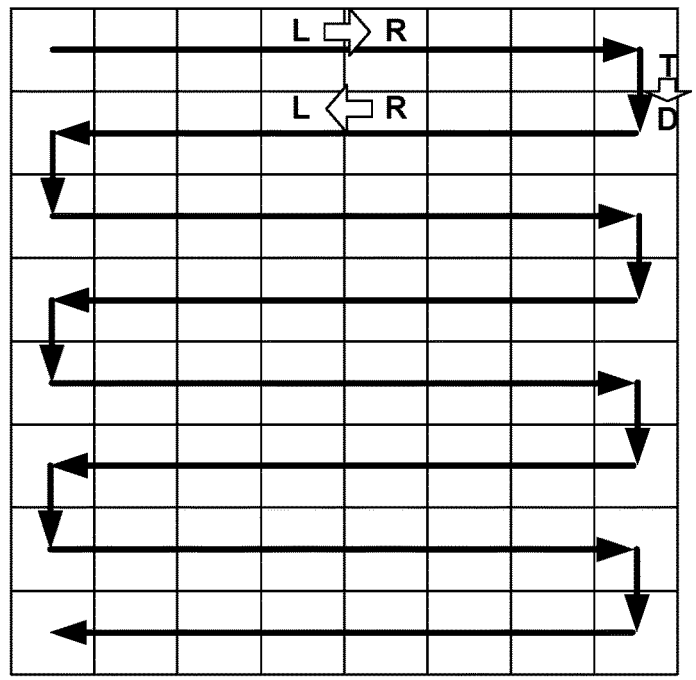
FIG. 2 illustrates an example of a horizontal traverse-like scanning order for predicting indices of a block using a copy-by-pattern-search mode.

In the present invention, various techniques to improve the performance of color index coding are disclosed. In particular, a new copy run mode that uses one or more previous decoded indices to identify index prediction candidates for a current index.

"Copy by Pattern Search" Mode

A new copy run mode, named Copy by Pattern Search mode (or copy-by-pattern-search mode) is disclosed in the present invention. Similar to the run mode and the copy-above mode, when the copy-by-pattern-search mode is used, a value "copy_run" (e.g., N) is transmitted or derived to indicate that for the following N positions (including the current one), the palette index is equal to the pattern-search-derived indices (also named candidate index predictors).

The pattern-search-derived indices are derived by using the pixels of previous K decoded pixels to find the same pattern in the previous decoded indices. Then, the following N indices starting from the current position are coded using the pattern-search-derived indices. K can be transmitted or derived. N and K are integers greater than or equal to 1.

Previous K decoded pixels can be located in non-continuous locations. Previous K decoded indices can be located in a special pattern of positions. For example, the previous two decoded pixels can be the above and left samples. In the case of K equal 1, a previous single decoded index is used as the search pattern. For example, the previous single decoded pixel can be the above sample. In another example, the previous single decoded pixel can be the left sample.

According to one embodiment, the decoder may check the candidates for the N following indices for redundancy. If any two candidates of N following indices are the same, a redundant candidate can be removed. Therefore, the decoder can use the remaining candidates.

In JCTVC-O0182, the joint color index is composed of three color indices. An embodiment of the present invention may also be based on the individual color indices. Accordingly, the K decoded indices may correspond to the joint color indices or individual color indices. In the case that K decoded indices correspond to joint color indices, the decoder will use the joint color indices pattern to search for a matching pattern in the previous decoded indices. When a matching pattern is found, the N following joint color indices are coded by the pattern-search-derived indices.

If K decoded indices are individual color indices, the decoder uses individual color indices pattern to search for a matching pattern in the previous decoded individual indices. In this case, the total number of indices to code the following N pixels will be N*X individual color indices corresponding to the N pattern-search-derived indices. X may correspond to the number of the color components and X can be transmitted or derived.

To avoid pattern search, the coding system may use a pattern relation table (PRT) to identify palette predictors for a current search pattern. The decoder may build the PRT and continue to track the position of its last occurrence.

When previous samples include escape pixels, the decoder can use the nearest non-escape pixels to find position of its last occurrence. Then, the decoder uses following N samples of the position excluding escape pixels as the pattern-search-derived indices.

According to one embodiment, the PRT table can be updated adaptively. The decoder can check the relation between the previous K decoded indices and the following N indices. If the following N indices are the same as the pattern indices already in the table, the decoder can skip the PRT table update. During PRT table updating, the decoder may check the relation between previous K decoded indices and the following N indices of the updated position of last occurrence. N can be transmitted or derived. If the following N indices correspond to one existing prediction pattern of another prediction mode, the decoder can skip update.

In the case that K=1 and N=1, if following N (i.e., 1) indices equal to previous K (i.e., 1) decoded indices, the decoder can skip the update.

Some examples of the PRT updating are listed below:
If the following 1 index equals to the previous 1 decoded index, the decoder can skip the PRT update.
If the following 2 indices equal to the previous 1 decoded index, the decoder can skip the update.
If the following 1 index equals to one of the previous 2 decoded indices, the decoder can skip the update.
If the following 2 indices equal to one of the previous 2 decoded indices, the decoder can skip the update.

Furthermore, during decoding, the decoder maintains a pattern relation table (PRT) to record the relation between the previous K decoded indices and following N indices. Before decoding new N indices, the decoder uses previous K decoded indices to search the prediction pattern of following N indices. N and K can be transmitted or derived.

An example of PRT is shown as Table 1. First column is the previous K decoded indices. In the example of Table 1, the PRT has a total of X entries for the previous K decoded indices. Each search pattern associated with the previous K decoded indices points to one entry in the PRT. Each entry has P candidate predictors. And the decoder can use the previous K decoded indices of the current pixel being decoded to identify P candidates as candidate predictors for the following N indices.

TABLE 1

| Previous K decoded indices | Cand. 1 of following N indices | ... | Cand. P of following N indices |
|---|---|---|---|
| Entry 1 | Cand. 1-1 | ... | Cand. 1-P |
| Entry 2 | Cand. 2-1 | ... | Cand. 2-P |
| ... | ... | ... | ... |
| Entry X | Cand. X-1 | ... | Cand. X-P |

In another example, the "Cand. of following N indices" may contain Z indices, the following N indices are derived from Z indices. Another example is that Z is 1 and the following N indices are all equal to the index.

The Previous K decoded indices in the pattern relation table can be joint color indices or individual color indices. P candidates in the pattern relation table can be color joint indices or individual color indices.

In the example of Table 1, there are multiple candidates (i.e., P) for the N following indices from the PRT. The decoder can check if there are same candidates for the N following indices in the P candidates. If so, the decoder may remove the redundant candidate or candidates and only use the remaining candidates.

To improve parsing throughput, if P candidates contain any escape index, the escape index can be set to a non-escape index (e.g., idx_re). The non-escape index can be transmitted or derived. The non-escape index can be set to 0 or set to the index with the highest occurrence. The non-escape index can also be derived from neighboring non-escape indices. In this case, a special index can be used to indicate where to copy the neighboring reconstructed pixel values. For example, the neighboring reconstructed pixel value can be from the above-left (AL), above-right (AR), left-down (LD), above (A), or left (L) pixel.

The number of the entries (i.e., rows in the exemplary Table 1) of the PRT can be the maximum number of possible combinations of the previous K decoded indices. The first column (i.e., search pattern corresponding to the previous K decoded indices) can be skipped in the PRT. The decoder can easily locate candidates in the derived entry without table search.

If the number of the entries (rows) of the PRT is not the maximum number of possible combinations of the previous K decoded indices, the decoder can maintain a small size guide table (GT) that indicates how to find candidates in the PRT based on the previous K decoded indices. For example, the GT may have N_max entries corresponding to the maximum number of possible combinations of the previous K decoded indices. The GT may use only 1 bit per entry to indicate if there is a valid candidate for the corresponding previous K decoded indices in the PRT. If there is no valid candidate, the PRT table search can be skipped.

The number of the entries (rows) of the PRT can be restricted to be no larger than a maximum size (e.g., size_max) to reduce the table size. The maximum size can be transmitted or derived. During decoding, if the size of entries is larger than size_max, one or more entries will be removed and new entries can be added into the PRT during the table update. The removed entry can be derived according to the time when the entry was latest used. The removed entry can also be derived according to the frequency that the entry is used. The removed entries may correspond to the entries with the longest latest-used-time, i.e. FIFO. The removed entries may also be the entries with the least used.

When updating the PRT, the decoder can check the relation between the previous K decoded indices and updated the candidate of following N indices. If the following N indices correspond to one existing prediction pattern of another prediction mode, the decoder can skip update. If the updated candidate equals to other candidates in PRT, the decoder can skip update. If the updated candidate equals to the previous decoded indices, the decoder can skip update.

When updating the PRT, the decoder can check the relation between the previous 1 decoded index and updated the candidate of following 1 index. If the previous 1 decoded index equals to following 1 index, the decoder can skip update.

In another example, when updating PRT, the decoder can check the relation between the previous K decoded indices and updated the candidate of following N indices. If the following N indices correspond to one existing prediction pattern of another prediction mode, the decoder can skip update.

The PRT can be propagated across Coding Unit (CU), Prediction Unit (PU) or Transform Unit (TU). In other word, the PRT can be shared (i.e., reused) among multiple CUs, PUs or TUs. The PRT only needs to be initialized at beginning of a slice, a tile or a Coding tree Unit (CTU). When the PRT propagates across CU/PU/TU, the tables can be modified before propagation.

An exemplary process for table modification rules is as follows:
  Propagate the major color tables from coding units A to B;
  Compare the major color tables between coding units A and B, and find corresponding colors; and
  Modify the index in PRT coding unit in A to the new PRT for B according to the found corresponding color relation.

A method to find the corresponding colors can be based on the difference of colors between the PRT for coding unit A and the PRT for coding unit B. For example, if the difference of a selected colors is less than a threshold value (e.g., "thrd_c"), the selected color is a corresponding color. The threshold value can be transmitted or derived.

In the run-based color index coding, the index coding modes such as the copy-above mode, copy-left mode and no prediction mode as disclosed in JCTVC-O0182, have to be signaled so that a decoder can reconstruct the index data correctly. The copy-by-pattern-search mode can be used as an additional coding mode in addition to the coding modes previously disclosed. An example for signaling the index coding modes according to an embodiment of the present invention is shown in Table 2 along with the index coding mode signaling based on JCTVC-O0182. The signal for index coding modes based on the present invention can be applied to normal line mode, where the index is pixel-wise predicted. However, the signal for index coding mode based on the present invention can also be applied to pixel-wise index prediction.

TABLE 2

| Prediction Mode | Signal Bits JCTVC-O0182 | Signal Bits |
|---|---|---|
| Copy top | 1 | 1 |
| Copy-left | 01 | 01 |
| No prediction | 00 | 0000 |
| copy top-left | | 0011 |
| copy top-right | | 0010 |
| Copy by PRT | | 0001 |

If the pixels to be coded are located adjacent to the boundary of the current coding unit, an embodiment of the present invention uses the neighboring pixels (NPs) of the current CU as the previous K decoded indices and as part of the previous K decoded indices to search PRT.

Figures 1A, 1B:
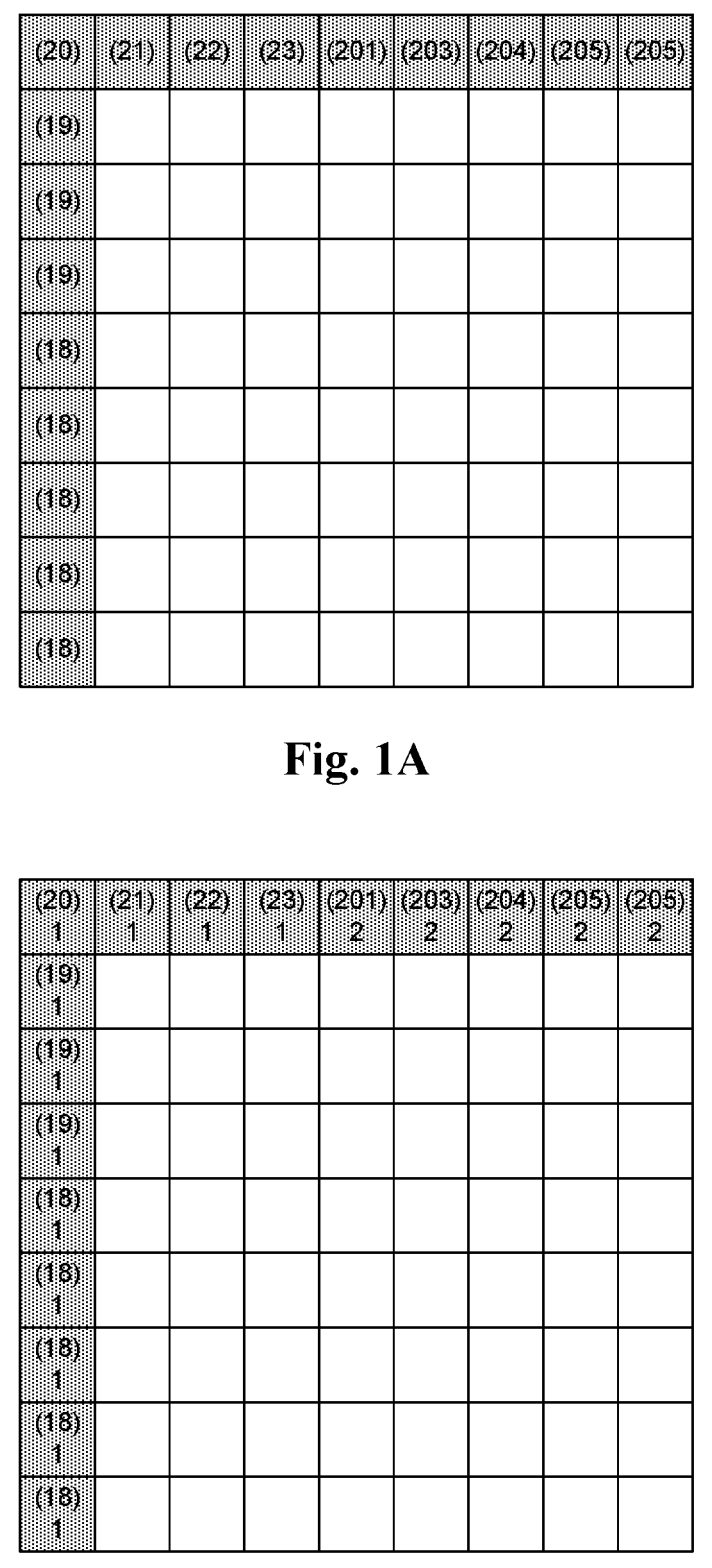

The pixel values of the NPs can be transformed into color indices according to a major color table. The transformed color indices are then used to predict the color indices of the current coding unit. Table 3 illustrates an example of color index table that can be used to transform color pixel values of the NPs into color indices. FIG. 1A and FIG. 1B illustrate an example of converting reconstructed color values of neighboring pixels to color indices according to the color index table in Table 3. In FIG. 1A, the neighboring pixels are shown as squares with filled patterns. The color values are shown as numbers in parentheses. These color values are mapped to color indices according to Table 3. The color values and corresponding color indices for the neighboring pixels are shown in FIG. 1B. The clear squares correspond to pixels of a current block (e.g., an 8×8 CU) to be predicted.

TABLE 3

| Color index | Pixel value |
|---|---|
| 1 | 20 |
| 2 | 200 |

According to present invention, the neighboring pixels can be any previously decoded or reconstructed pixels, including spatial neighboring pixels or temporal neighboring pixels. The neighboring pixels can be the reconstructed pixels without any in-loop filtering such as sample adaptive offset (SAO) or deblocking filter as disclosed in the High Efficiency Video Coding (HEVC) standard. The neighboring pixels can also be the reconstructed pixels filtered by SAO, deblocking filter, or both SAO and deblocking filter. Temporal NPs can be the pixels at the collocated positions in the reference picture or the locations indicted by motion vectors, where the motion vectors may be a disparity vector (DV) pointing to an interview reference picture or a block vector (BV) pointing to the current picture. In the example of FIG. 1A and FIG. 1B, the NPs correspond to the pixels located in the nearest above row and the nearest left column.

PRT Storing Pixel Values

The exemplary PRT in Table 1 implies that the candidates of the following N indices corresponds to the index values are stored. However, the PRT may also store the pixel values directly instead of the index values. When a value "copy_run" (e.g., N) is transmitted or derived to indicate that for the following N positions (including the current one), the predicted pixel values are equal to the pattern-search-derived pixel values. N can be one. The predicted pixel values can equal to reconstructed pixel values. The updating method can be the same as the updating method for the PRT storing the index values. The PRT may contain Z pixel values in each entry corresponding to one previous K indices pattern and the following N pixel values are derived from the Z values. Z can be any integer greater than or equal to 1.

The PRT that stores the pixel values is similar to Table 1 that stores the pixel indices. First column is the previous K decoded indices. The decoder can use the previous K decoded indices of the current decoding index to identify an entry (i.e., one row) in the PRT to find P candidates as predictors for following N pixel values. However, the PRT stores the pixel values instead of indices in this case.

When the PRT stores the pixel values instead of indices, various configurations, use cases, table updating and redundancy removal methods mentioned previously for the case of storing indices are applicable to the current case. For example, K can be 1 and N can be 1. The PRT can be propagated across CU/PU/TU with or without modification. In the case of PRT propagation cross CU/PU/TU, the PRT propagation can be reset at a slice-level, tile-level, CTU-row-level, or CTU-level. The reset can be turned On when a process names Wavefront Parallel Processing (WPP) is applied. For the reset process, the PRT can be set to a predefined or derived value, e.g. 0 for first PRT candidates and 1 for second PRT candidates, or inherit the PRT from its upper-right block. The WPP feature is used in High Efficiency Video Coding (HEVC), where each row of Coding Tree Units (CTUs) can be processed in parallel as substreams by multiple encoding or decoding threads. In order to limit the degradation of coding efficiency, a wavefront pattern of processing order ensures that dependencies on spatial neighbors are not changed.

An example of propagating PRT across CU/PU/TU with modification is described as follows. Corresponding values between palettes of the current CU and the predictor (or previous CUs) can be identified first. Entry positions and candidate values are changed according to corresponding values.

For the PRT that stores the pixel values, the previous K decoded indices in the prediction table can be joint color indices or individual color indices. P candidates in the prediction table can be joint color indices or individual color indices. In one example, the previous K decoded indices can be derived from one or more component-wise color indices.

More Examples of PRT

The following examples, PRTs can be applied to both cases for PRT storing pixel indices and pixel values. In one example, the PRT may use individual bit depths for different color components when deriving the previous K decoded indices. For example, H1 MSBs of color component 1, H2 MSBs of color component 2, and H3 MSBs of color component 3 for each index can be used to derive the previous K decoded indices. The color components may correspond to R/G/B or Y/U/V format. The bit depths H1, H2 and H3 may be the same or different. A more important color component (e.g., Y in Y/U/V) may use more bits, such as H1>=H2>=H3 or H1>=H3>=H2. In the case of Y/U/V format, H1 MSBs may be used for the Y component. The H1/H2/H3 bit depths can be 3/3/1, 3/1/3, 3/3/0, 3/0/3 or 2/2/2.

As mentioned before, P can be 1 or larger. When P is larger than 1, an encoder may need to signal (e.g., "USED_CAND") which candidate is used. Upon signaling which candidate is used for the current pixel, different context model can be used to code the current pixel according to previous signaling.

In one example, P context models can be used, and the context models are derived from the previous decoded candidate signal. A decoder may store the last candidate signal and use it for context-based decoding. This last candidate signal can be propagated across CU/PU/TU with or without modification.

In another example, P context models can be used, and the context models are derived from previous decoded candidate signal with the same "previous K decoded indices". Again, a decoder may store the last candidate signal of "previous K decoded indices". The PRT table can be propagated across CU/PU/TU with or without modification.

The last candidate signal/table propagation disclosed above can be reset at slice-level, tile-level, CTU-row-level, or CTU-level. The reset can be turned On when WPP is applied. For the reset process, the last candidate signal/table can be set to a predefined or derived value (e.g., 0) or inherit the last candidate signal/table from its upper-right block.

An example of updating the PRT for the case of K=1, N=1 and P=2 is described as follows.

Before updating, the decoder can check whether the updated candidate equal to the previous decoded index or the candidate in the first entry (i.e., Cand. 1). If the result is yes, the decoder can skip the updating.

If the updated candidate equal to the candidates in the previous decoded index entry in the PRT (including Cand.1 or not), the decoder can drop the same candidate in the PRT and shift other candidates forward.

Place the updated candidate in the first entry (i.e. Cand.1).

The above updating procedure corresponds to a FIFO based method. "The first entry (i.e. Cand.1)" can be a predefined entry. When the updated candidate is an escape color, the decoder can skip updating.

In another example, before updating the PRT, the decoder can also check whether the updated candidate is equal to other index predictors, such as the above sample, left sample, above-left sample, above-right sample or some selected color indices, the decoding can be skipped if the updated candidate is equal to one of the index predictor.

In another embodiment based on the copy-by-pattern-search mode, the PRT stores the motion vectors (MVs) instead of the indices for coding the current pixel. The motion vector (MV) is used to locate a reference pixel and the reference index of the reference pixel is used as an index predictor of the current pixel. Similar to the case of PRT storing the indices, the previous K decoded indices are used to find the same pattern in the previous decoded indices. Then following N indices will be coded using the reference index retrieved according to the MV.

Other than the index (i.e., the reference index) is located based on the MV in the PRT, the configurations, use cases, table updating and redundancy removal methods associated with the copy-by-pattern-search mode with the PRT storing the MVs are similar to those with PRT storing indices.

As in the case of the PRT storing indices, the pixel values can be directly predicted instead of index values. When a value "copy_run" (e.g., N) is transmitted or derived to indicate that for the following N positions (including the current one), the predicted pixel values is equal to the pattern-search-derived pixel values. The predicted pixel values can equal to reconstructed pixel values. Similarly, the retrieved pixel values of the reference pixels pointed by the MVs can be used directly as predictors instead of the indices. Also, as in the case with PRT storing indices, signaling the candidate selection (i.e., P) may use different context models according previous signaling. This also applies to the case of the PRT storing the MVs.

In one embodiment of the present invention, the copy-by-pattern-search mode can adaptively use different tables according to the scan direction. The position relation between previous decoded indices (pilot indices) and to-be-encoded indices will be different for different scanning orders. Accordingly, an embodiment of the present invention uses different tables or candidates to record the index transition patterns and to predict to-be-coded index according to a prediction direction. According to an embodiment of the present invention, the decoder can maintain X TC tables/candidates for Y scan directions, where X and Y are integers greater than 0.

An example of horizontal traverse-like scanning order is shown as FIG. 2, which includes three scan directions as shown. This scan pattern is also known as a horizontal snake scan in the literature. The three scan directions correspond to left to right, right to left and top to down. The decoder can maintain X PRT tables for Y scan directions. In the case of X=3 and Y=3, there are three tables (i.e., PRTs) corresponding to L-to-R table, R-to-L table and T-to-D table respectively. In the following description, it further assumes that the system uses previous 1 (i.e., K=1) decoded index. Therefore, only one previous decoded index is used for pattern search to locate a predictor in the PRT. In the case with K=1, the one previous decoded index is called a pilot index for convenience. When the scan direction is left to right, the decoder uses the previous decoded index (i.e., the left position of the current pixel) as pilot index to search the L-to-R PRT table to get PRT candidates. When the scan direction is right to left, the decoder uses previous decoded index (i.e., the right position of the current pixel) as the pilot index to search the R-to-L PRT table. When the scan direction is top to down, the decoder uses previous decoded index (i.e., up position of the current pixel) as the pilot index to search the T-to-D PRT table.

If X is not equal to Y, some scan directions will share the same table. For example, X is equal to 2 and Y is equal to 3 for the traverse scan in FIG. 2. When the scan direction is left to right, the decoder uses the previous decoded index as the pilot index to search the first PRT table. When the scan direction is right to left, the decoder searches the second PRT table. When the scan direction is top to down, the decoder may either search one of the PRT tables or skip the PRT prediction.

The table update process for the adaptive scanning order is similar to that for the case with a fixed scanning order. However, the table is updated separately for different scanning directions. In the case of K=1 and N=1, the previous K decoded indices become the previous 1 decoded index (i.e., the pilot index). The table updating is based on the index pair, (pilot index, candidate index). When different scan directions are used, the decoder uses previous index and current index to generate different updating index pairs according to the scan direction after decoding an index.

Figure 3:
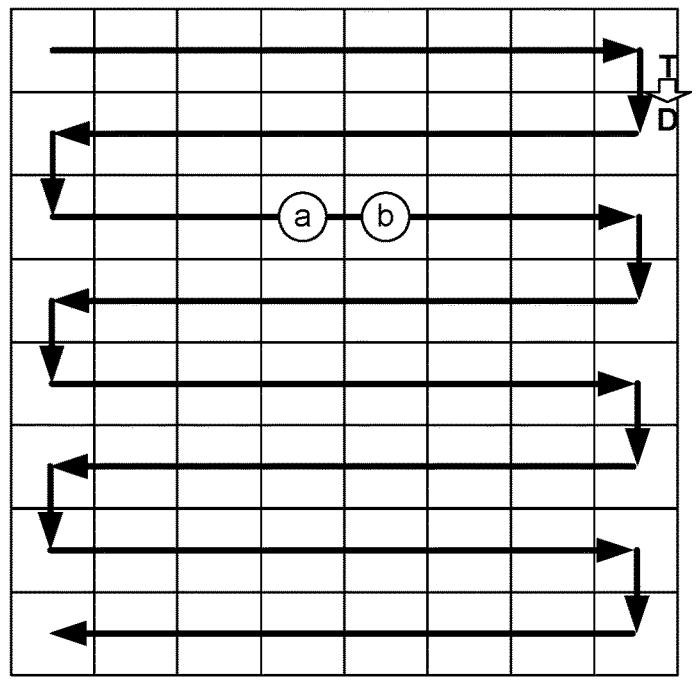
FIG. 3 illustrates an example to generate different updating index pairs for different PRTs according to a scan direction.

FIG. 3 illustrates an example to generate different updating index pairs for different PRTs according to a scan direction. In the example, (a, b) corresponds to indices of the two pixels circled in the third row, where a is the previous index and b is the current index. To update L-to-R table, the pair (pilot index, candidate index)=(a, b) is used, which means that a is used to find the to-be-updated entry and b is the candidate to be updated. On the other hand, to update R-to-L table, the index pair (pilot index, candidate index) will be formed by swapping the two indices, i.e., (current index, previous index)=(b, a). Therefore, the index value b is used to find the to-be-updated entry and a is the candidate to be updated. To update T-to-D table, the decoder can use (upper index, current index)=(T, R) as (pilot index, candidate index).

Figures 4, 5A, 5B:
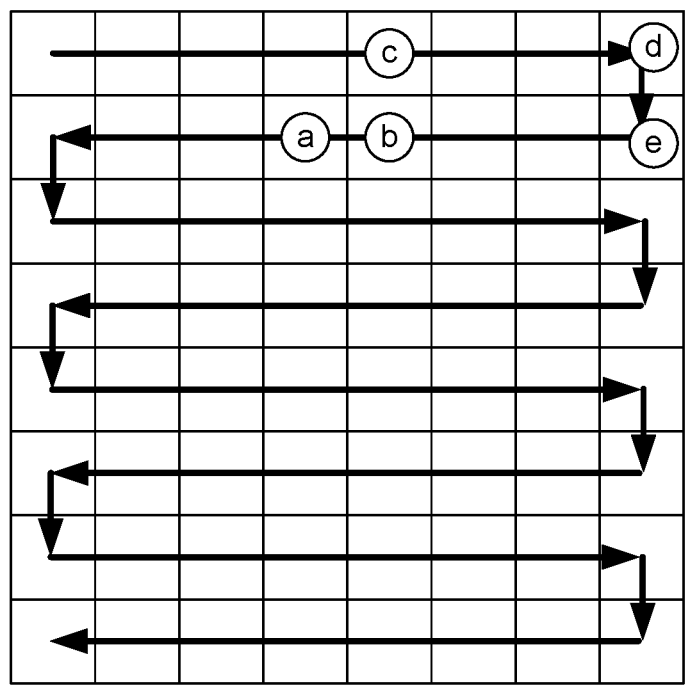
FIG. 4 illustrates another example of updating multiple PRTs using data for one scan direction.
FIGS. 5A-5B illustrate examples of redundancy in index prediction according to previous coding mode and index predictor.

FIG. 4 illustrates another example of updating multiple PRTs using data for one scan direction. The pair of data (b, a) is in the second row having R-to-L scan direction. Accordingly, (previous index, current index) corresponds to (b, a), and the (b, a) pair is used as (pilot index, candidate index) to update the R-to-L table. On the other hand, the (a, b) pair is used as (pilot index, candidate index) to update the L-to-R table. Furthermore, the (c, b) pair can be used for updating the T-to-D table. The (d, e) pair in the top-to-down scan direction as shown in FIG. 4 can be used as the (pilot index, candidate index) pair for updating the T-to-D table. The (d, e) pair may also be used for other tables updating.

Different tables for different scan directions can be merged into a table. For example, there are $L_1$ candidates for the first scan direction, ..., and $L_M$ candidates for the M-th scan direction. These M tables can be merged into one table consisting of a total of L candidates, where $L = L_1+, \ldots, +L_M$.

The decoder can search the PRT associated with a scan direction different from the current direction. For example, the scan direction is left-to-right and previous index is a as shown in FIG. 3. The decoder can use index a to search candidates in the R-to-L table. The corresponding entry number (i.e., the row number in Table 1) of matched candidates (i.e., index a) can be used to predict the current to-be-encode index. Similar procedure can be derived for cases using other scan directions.

While a horizontal snake scan pattern is shown above to illustrate examples of multiple PRTs associated with scan directions, the embodiment may also be extended to other scanning orders such as (horizontal/vertical) raster scan, (horizontal/vertical) traverse scan (i.e., snake scan), or Hilbert scans. The table updating process as disclosed about can be applied to the case of different scanning orders. The use of PRT associated with one direction for another direction as disclosed above can also be applied to different scan patterns similarly.

The PRT mode can be disabled for some scan directions. For example, the PRT mode for the top-to-down direction in FIG. 2 can be disabled.

Rectifying of Invalid PRT Index

In the copy-by-pattern-search mode as disclosed above, if the derived candidate index is larger than the maximum index in the current CU, the index is invalid. If the escape index is not used, the total number of indices allowed for the current CU becomes (maximum index−1). In this case, the index is invalid if it is greater than (maximum index−1). Accordingly, an embodiment of the present invention checks for any invalid index and replace the invalid index by a derived or fixed index value before applying PRT prediction.

When an invalid index is determined, the system may decide whether to modify or rectify the invalid index. For example, if a derived candidate index is larger than the maximum index or (maximum index−1) in case of no escape index used in the current CU, a smallest possible index value that is not one of the current candidate indices is used as the PRT prediction index. For example, if the derived PRT index candidates are {25, 1, 10, 2} and (maximum index−1) for the current CU without escape index is 8, both indices 10 and 25 have to be replaced by the smallest possible index values. Accordingly, the derived PRT index candidates are modified or rectified to {0, 1, 3, 2} before applying the index prediction. Note that {0 and 3} are the smallest values of the possible index value other than the valid PRT candidates (i.e., 1 and 2).

Modifying Invalid PRT Index According to Previous Run

In Screen Content Coding Test Model 2.0 (SCM2.0), if the previous run is copy-above run, the current index cannot be the same to the above index of the current index when it is encoded by a new copy-left run. Otherwise, the current index coding can be merged into the previous run. FIG. 5A illustrates one exemplary scenario, where the current index is shown as "?". The previous 4 indices are coded using the copy-above mode and the index above the current index is "8". Therefore, if the current index is coded using the copy-left mode, the current index cannot be the same as the above index (i.e., 8). The similar redundancy check can be applied to the case with the copy-left run mode. In this case, the current index cannot be the same as the left index. FIG. 5B illustrates one exemplary scenario, where the current index is shown as "?". The previous 4 indices are coded using the copy-left mode and the index at left of the current index is "3". In this case, the current index cannot be 3. Otherwise, the current index coding can be merged into the previous run. This redundant index value is referred as Irun_red in this disclosure. Accordingly, Irun_red=8 for FIG. 5A and Irun_red=3 for FIG. 5B.

Similarly, if the derived PRT index predictor is the same as Irun_red, the predictor is redundant. Accordingly, in an embodiment of the present invention, if any PRT predictor is equal to Irun_red, the index predictor is replaced by a fixed or derived value, such as 0 or the smallest index value that is not equal to other predictors or Irun_red. For example, in the case of the number of candidates being 1 (i.e., P=1), the decoder may use the pilot index to find a PRT predictor. If the PRT predictor is equal to Irun_red, the decoder can replace the PRT predictor by a fixed or derived value. This value can be 0. If Irun_red is 0, this value can be 1. In another example with the number of candidates (i.e., P) being larger than 1, the decoder may use the pilot index to find P PRT predictors. If any PRT predictor is the same as Irun_red, the decoder replaces the PRT predictor by a fixed or derived value. This value can be 0. Alternatively, the value can be set to the smallest index that is not equal to other non-redundant predictors or Irun_red.

The new index added to the modified or rectified PRT can be used to update the current PRT adaptively. The updating may depend on whether the new index is selected as the current index prediction (i.e., a prediction hit). At the decoder side, the decoder will update the PRT with the new index added to the rectified PRT that is selected as a predictor for the current index. If the number of candidates (i.e., P) is large than 1, the selected new index candidate can be placed at the first candidate location in the PRT and other candidates in the PRT are shifted down by one candidate position (i.e., FIFO).

Removing Redundant Index According to PRT Index

In SCM 2.0, the encoder will remove a redundancy index value before signaling index value. For example, if previous run is copy-above mode and the above index of current run is redundant (e.g., a scenario shown in FIG. 5A). If previous run is copy-left mode, the left index of current run is redundant (e.g., a scenario shown in FIG. 5B). In index reconstruction stage, the decoder will determine the removed redundant index value. If the parsed index value is larger than or equal to the removed redundant index value, the reconstructed index value is the parsed index value plus 1. Otherwise, the reconstructed index value is the parsed index value.

In parsing stage, the decoder needs to check several conditions for any redundant index in the PRT. For example, if the previous run is copy-above mode and the above sample is not coded as an escape index (e.g., a scenario shown in FIG. 5A), then the above index can be treated as a redundancy index value and be removed from index coding. Otherwise, the redundancy index value is invalid. Similarly, a redundant index can also be identified for the copy-left mode.

For example, if the previous run mode is copy-above mode, the above index (e.g., 3) and TC index (e.g., 1) are redundant. Therefore, there are two redundant indices, {1, 3}. In the parsing stage, these two redundant index values are removed.

In order to reduce parsing complexity, an embodiment of the present invention removes a fixed amount of redundant index (e.g., 1) in index coding. For example, if there are two redundant indices, the smallest one is designated as a redundant index. Therefore, in the parsing stage, only a fixed number (i.e., 1) of possible index value is removed. In the reconstruction stage, the removed redundant index is determined by identifying the smallest index of all redundant indices.

Furthermore, if the derived PRT candidate index is larger than the maximum index or (maximum index−1) in the case with an escape index in the current CU, the PRT rectification process as disclosed above can be used to remove the redundant index.

For example, if the previous run mode is copy-above mode, the above index (e.g., 3) and TC index (e.g., 1) are redundant. Therefore, there are two redundant indices, {1, 3}. In the parsing stage, only one redundant index value is removed. And, in the reconstruction stage, the removed index is calculated as 1 (the smallest one of all redundant indices).

In another example, if the previous run mode is copy-above, the above index is 3, PRT index is 20, and the (maximum index−1) for the current CU is 10, then there are two redundant indices, {0, 3}. In this example, PRT index 20 is replaced by index 0. In the parsing stage, only one redundant index value is removed. In the reconstruction stage, the removed index is determined to be 0 since it is the smallest one of all redundant indices.

PRT Run Mode Signaling

If the number of colors in the current palette of the current CU is small, an embodiment of the present invention may disable the copy-by-pattern-search mode. If the possible index values are few, a system does not need many prediction modes. Therefore, some modes can be disabled to save bits of mode signaling. For example, if the maximum possible index value of the current CU is less than a fixed or derived number, the copy-by-pattern-search mode is disabled. For example, the fixed number can be equal to 2. The number can depend on whether the copy-by-pattern-search predictor can be rectified to a valid index number after rectification process as disclosed above.

If the number of colors in the current palette is small, another embodiment of the present invention reduces the candidate number in the PRT and reduces candidate index signaling. For example, if the maximum possible index value of the current CU is less than a fixed or derived number, (e.g., Thrd_P), the number of PRT candidates can be reduced to smaller number (e.g., P_R). As an example, Thrd_P can be 3 and P_R can be 1, and the candidate index signaling is disabled. In another example, Thrd_P and P_R can be related such as Thrd_P=N_P, and P_R=(N_P−2), where N_P is an integer. If there in any invalid or redundant index among P_R candidates of the PRT, the PRT can be rectified using the process disclosed above. If the copy-by-pattern-search mode is disabled or the number of PRT candidates is reduced, the PRT updating process can be performed adaptively.

The copy-by-pattern-search mode (also named PRT mode) disclosed herein can be combined with other palette coding modes. For example, the PRT mode can be combined with the conventional palette coding modes: index mode and copy-above mode. An exemplary syntax design for these palette coding modes is shown in Table 4.

TABLE 4

| Run mode syntax | Run mode |
| --- | --- |
| 10 | Copy-above mode |
| 11 | PRT mode |
| 0 | index mode (copy-left) |

The run mode syntax can be coded using context-based coding with two syntax models (e.g., CTX0 and CTX1). The decoder can use the above run mode or the previous run mode to infer possible current run mode. For example, if the run mode of the above pixel is the index mode, the current run mode is likely to be the index mode as well. Similarly, if the run mode of the previous pixel (e.g., the left pixel) is the index mode, the current run mode probably is the index mode. Therefore, the first bit can be coded using the first syntax model if the above (or previous) run mode is the index mode, and otherwise using the second syntax model. The second bit can be coded using the first syntax model if the above (or previous) run mode is the copy-above mode, and otherwise using the second syntax model.

In another example, the first bit can be coded using the first syntax model if the above (or previous) run mode is the index mode, and otherwise using the second syntax model. The second bit can be coded using the first syntax model if the above (or previous) run mode is the PRT mode, and otherwise using the second syntax model.

In another example, two sets of syntax model are used for different bits. For example, syntax modes CTX0_0 and CTX0_1 are used for the first bit and syntax models CTX1_0 and CTX1_1 are used for the second bit. The first bit can be coded using syntax model CTX0_0 if the above (or previous) run mode is the index mode, and otherwise using syntax model CTX0_1. The second bit can be coded using syntax model CTX1_0 if the above (or previous) run mode is the copy-above mode, and otherwise using syntax model CTX1_1.

In another example, the first bit can be coded using syntax model CTX0_0 if the above (or previous) run mode is the index mode, and otherwise using syntax model CTX0_1. The second bit can be coded using syntax model CTX1_1 if the above (or previous) run mode is the PRT mode, and otherwise using syntax model CTX1_0.

If the PRT mode is signaled, the candidate index is then signaled to indicate which PRT candidate is used for prediction if needed (e.g., P>1).

While Table 4 shows an example of signaling bits for run modes including the PRT mode, other signaling bits can also be used. Table 5 illustrates another example of signaling bit design for run modes.

TABLE 5

| Run mode syntax | Run mode |
| --- | --- |
| 1 | Copy-above mode |
| 01 (or 00) | TC mode |
| 00 (or 01) | index mode (copy-left) |

Again, context based coding may be used for the signaling bits. For example, two syntax models, CTX0 and CTX1 can be used. The syntax model selection may be based on the run mode of the above pixel or the run mode of the previous pixel. For example, if the run mode of the above pixel is copy run mode, CTX1 is used. If the run mode of the above pixel is the PRT mode or index mode, CTX0 is used.

Table 6 illustrates yet another example of signaling bit design for run modes.

TABLE 6

| Run mode syntax | Run mode |
| --- | --- |
| 10 (or 11) | Copy-above mode |
| 11 (or 10) | PRT mode |
| 0 | run mode (copy-left) |

If the system further includes a copy previous mode, the table shown above can be modified to accommodate the additional mode as shown in Table 7.

TABLE 7

| Run mode syntax | Run mode |
| --- | --- |
| 10 (or 11) | Copy-above mode |
| 11 (or 10) | Copy previous row mode |
| 01 (or 00) | PRT mode |
| 00 (or 01) | run mode (copy-left) |

Similar to previous examples, the signaling bits may be coded using two syntax models, CTX0 and CTX1. The run mode of the above pixel or the run mode of the previous pixel can be used to select the context model. For example, if the run mode of the above pixel is copy run mode or copy previous row mode, context model CTX1 is used. If the run type of the above pixel is the PRT mode or index mode, syntax model CTX0 is used.

The second bin can be coded using separate context models (e.g., CTX2 and CTX3). The system can use the first decoded bin or the current run mode to select a context model. For example, if the first decoded bin is 0, context model CTX2 is used. If the first decoded bin is 1, syntax model CTX3 is used.

To encode the run length associated with the run mode, different context sets can be selected according to the current run type. For example, if there are N run types, N context sets corresponding to the N run types for the run length coding can be used. In another example, if there are N run types, M (M<N) context sets can be used for run length coding. Some run type can share the same context set. For example, the PRT mode and index mode (copy-left) may share the same context model set. In another example, the copy-above mode and copy previous row may share the same context model set.

The performance of a coding system incorporating an embodiment of the present invention is compared to that for an anchor system. The anchor system corresponds to the system based on SCM-2.0, where palette coding modes including copy-above and copy left are used. The embodiment of the present invention includes the additional PRT mode. The comparisons are performed under various coding configurations including All Intra (AI), Random Access (RA) and Low-delay B frame (LB). The comparison results are summarized in Table 8. As shown in Table 8, the performance improvements in terms of bitrate are 1.2%, 0.4% and 0.4% for AI, RA and LB configurations respectively.

TABLE 8

| Lossy coding BD-rate | AI | RA | LB |
|---|---|---|---|
| YUV, text & graphics with motion, 1080 p | −1.2% | −0.4% | −0.4% |

Figure 6:
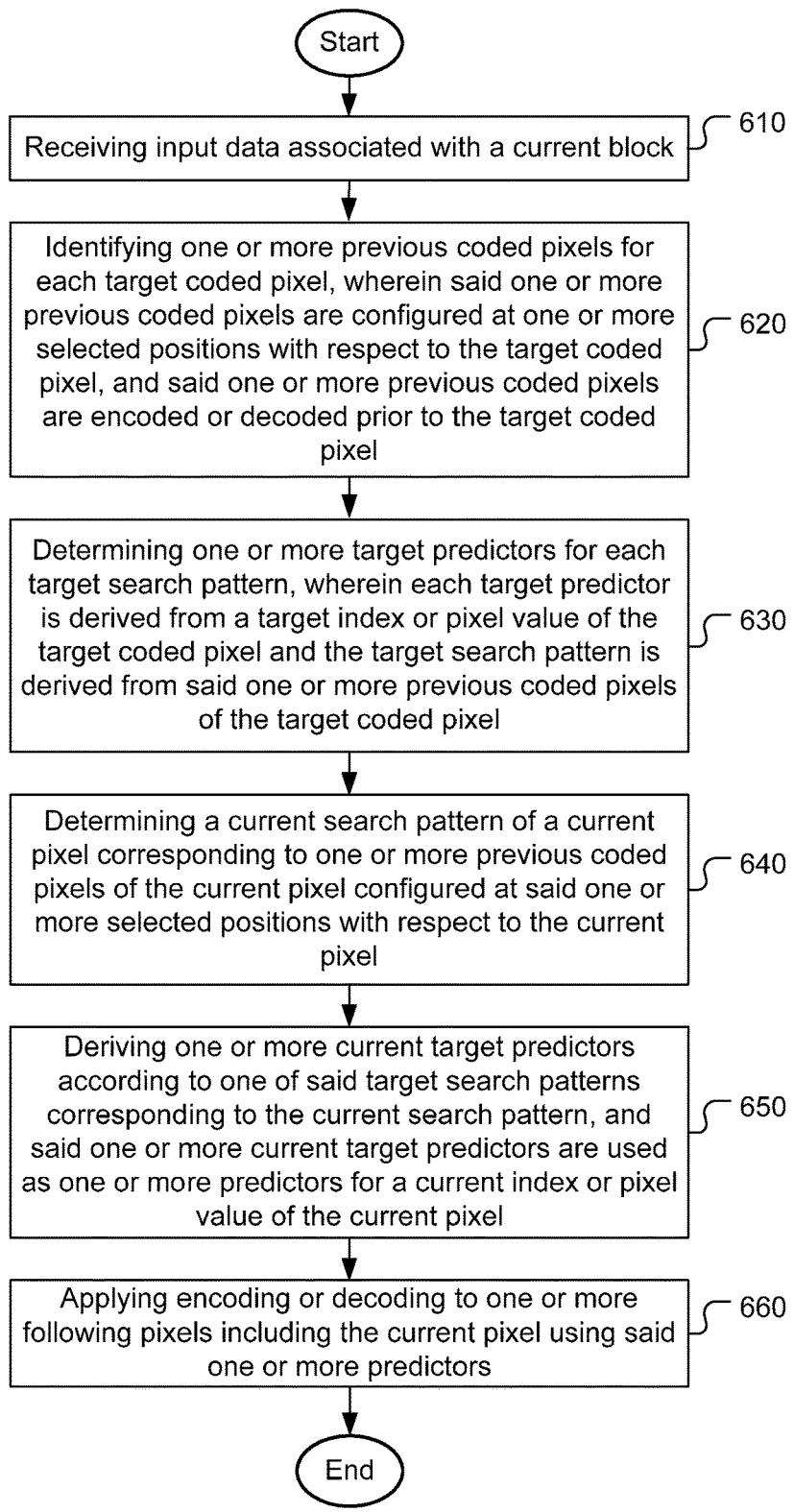
FIG. 6 illustrates an exemplary flowchart of a system for color index or pixel value coding including the copy-by-pattern-search mode according to an embodiment of the present invention.

FIG. 6 illustrates an exemplary flowchart of a system for color index prediction using coding mode including the copy-by-pattern-search mode according to an embodiment of the present invention. The system receives input data associated with a current block as shown in step 610. The input data corresponds to pixel data or color indices of the current block to be coded at an encoder side or corresponds to coded data or coded color indices of the current block to be decoded at the decoder side. The input data may be retrieved from memory (e.g., computer memory, buffer (RAM or DRAM) or other media) or from a processor. One or more previous coded pixels are identified for each target coded pixel in step 620. The one or more previous coded pixels are configured at one or more selected positions with respect to the target coded pixel. For example, the one or more previous coded pixels correspond to two previous coded pixels and the two previous coded pixels can be configured as one pixel above and one pixel to the left of the target pixel. Furthermore, the one or more previous coded pixels are encoded or decoded prior to the target coded pixel. Therefore, when the target pixel is processed, decoded indices or pixel values of the one or more previous coded pixels will be available. One or more target predictors for each target search pattern are determined in step 630, where each target predictor is derived from a target index or pixel value of the target coded pixel and the target search pattern is derived from the one or more previous coded pixels of the target coded pixel. The target search pattern may correspond to the decoded indices or pixel values of the one or more previous coded pixels. In this step, transitional relationship between the search pattern and the subsequent pixel (i.e., the target coded pixel) are captured using pixels already coded before the current pixel. In order to code a current pixel using the determining a current search pattern of a current pixel corresponding to one or more previous coded pixel values of the current pixel using the copy-by-pattern-search mode, the current search pattern of a current pixel is first determined in step 640. The current search pattern corresponds to one or more previous coded pixels of the current pixel configured at said one or more selected positions with respect to the current pixel. Again, the current search pattern corresponds to decoded indices or pixel values of the one or more previous coded pixels of the current pixel. One or more current target predictors are derived in step 650 according to one of said target search patterns corresponding to the current search pattern, and said one or more current target predictors are used as one or more predictors for a current index or pixel value of the current pixel. Encoding or decoding is applied to one or more following pixels including the current pixel using said one or more predictors as shown in step 660. The predictors may correspond to index predictors or pixel value predictors.

The flowchart shown is intended to illustrate an example of index or pixel value coding using the copy-by-pattern-search mode according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding a current block of video data using palette coding for a video coding system, the method comprising:
receiving input data associated with the current block;
maintaining a pattern relation table (PRT), which includes one or more entries, by performing at least:
for a particular entry of the PRT, recording a search pattern and one or more corresponding predictors, wherein the search pattern is derived from value or values of K previous coded pixel or pixels, each of the one or more corresponding predictors corresponds to candidate value or values of N following pixel or pixels associated with the K previous coded pixel or pixels, and K and N are integers equal to or greater than one;
determining a current search pattern for a current pixel based on K pixel or pixels at K selected position or positions coded before the current pixel;
searching the PRT to identify one of the one or more entries which contains a search pattern identical to the current search pattern;
setting one of one or more predictors recorded in the PRT in association with the identified entry as a current predictor; and
applying encoding or decoding to N pixel or pixels, including the current pixel and after the K pixel or pixels at the K selected position or positions coded before the current pixel, according to the current predictor.

2. The method of claim 1, wherein
K is set to one such that the K previous coded pixel or pixels for the particular entry of the PRT corresponds to a first pixel,
N is set to one such that the N following pixel or pixels for the particular entry of the PRT corresponds to a second pixel, and
the first pixel is at a left side of the second pixel.

3. The method of claim 1, wherein, for the particular entry of the PRT,
the search pattern is derived from index value or index values of the K previous coded pixel or pixels, and
the index value or index values correspond to one or more individual color indices.

4. The method of claim 1, wherein, for the particular entry of the PRT,
the search pattern is derived from index value or index values of the K previous coded pixel or pixels, and
the index value or index values correspond to one or more joint color indices.

5. The method of claim 1, further comprising repetitively applying the current predictor to pixels following the N pixel or pixels for a number of times according to a run length value.

6. The method of claim 1, wherein the PRT stores, for the particular entry of the PRT, index values or pixel values used as the one or more predictors.

7. The method of claim 1, further comprising updating the PRT according to the current search pattern and value or values of the N pixel or pixels that include the current pixel and follow the K pixel or pixels.

8. The method of claim 7, wherein when K is set to one and N is set to one, the PRT is updated according to a decoded index or pixel value on a left side of the current pixel and a current index or pixel value for the current index.

9. The method of claim 7, wherein the updating the PRT is not performed when the N pixel or pixels, including the current pixel and following the K pixel or pixels, correspond to a search pattern included in the one or more entries of the PRT.

10. The method of claim 7, wherein the updating the PRT is not performed when the N pixel or pixels, including the current pixel and following the K pixel or pixels, correspond to one existing prediction pattern of another prediction mode.

11. The method of claim 7, wherein the updating the PRT is not performed when the N pixel or pixels, including the current pixel and following the K pixel or pixels, correspond to a predictor recorded in the PRT.

12. The method of claim 1, further comprising:
removing a selected entry of the PRT when an associated search pattern of the selected entry corresponds to a longest latest-used-time search pattern or a least used search pattern.

13. The method of claim 1, further comprising, when the PRT stores more than one predictor in association with the identified search pattern, identifying the one of the predictors according to a selection indication.

14. The method of claim 1, wherein the PRT contains a replacement index that is used in place of an escape index.

15. The method of claim 1, wherein the PRT is reused by multiple blocks corresponding to coding units (CUs), prediction units (PUs) or transform units (TUs) within a coding tree unit (CTU), a tile, or a slice.

16. The method of claim 1, wherein
a scanning pattern traverses through all pixels of the current block in multiple directions, and
multiple PRTs associated with the multiple directions are used for the encoding or decoding of the N pixel or pixels that include the current pixel and follow the K pixel or pixels.

17. The method of claim 1, further comprising, when the current predictor includes a particular index or pixel value that is larger than a threshold value, replacing the particular index or pixel value by a predefined index or pixel value, or a derived index or pixel value.

18. The method of claim 1, further comprising, when the current predictor includes a particular index or pixel value that is redundant according to a previous pixel or an above pixel, replacing the particular index or pixel value by a predefined index or pixel value, or a derived index or pixel value.

19. The method of claim 1, further comprising removing, in a parsing stage, redundant index values according to a previous pixel, above pixel, or derived palette predictor.

20. The method of claim 1, wherein the encoding or decoding further comprises a copy-above mode and a copy-left mode.

21. An apparatus for coding a current block of video data using palette coding for a video coding system, the apparatus comprising one or more electronic circuits configured to:
receive input data associated with the current block:
maintain a pattern relation table (PRT), which includes one or more entries, by performing at least:
for each entry of the PRT, recording a search pattern and one or more corresponding predictors, wherein the search pattern is derived from value or values of K previous coded pixel or pixels, each of the one or more corresponding predictors corresponds to candidate pixel value or values of N following pixel or pixels associated with the K previous coded pixel or pixels, and K and N are integers equal to or greater than one;

determine a current search pattern for a current pixel based on K pixel or pixels at K selected position or positions coded before the current pixel;

search the PRT to identify one of the one or more entries which contains a search pattern identical to the current search pattern;

set one of one or more predictors recorded in the PRT in association with the identified entry as a current predictor; and apply encoding or decoding to N pixel or pixels, including the current pixel and following the K pixel or pixels at the K selected position or positions coded before the current pixel, according to the current predictor.

\* \* \* \* \*